United States Patent
Yoshida et al.

[11] Patent Number: 5,886,853
[45] Date of Patent: Mar. 23, 1999

[54] LIBRARY APPARATUS

[75] Inventors: Kenichi Yoshida; Katsumi Inazawa; Hiroaki Nishijo, all of Kawasaki, Japan

[73] Assignee: Fujitsu Ltd., Kawasaki, Japan

[21] Appl. No.: 744

[22] Filed: Dec. 30, 1997

[30] Foreign Application Priority Data

Jul. 7, 1997 [JP] Japan .................................. 9-181558

[51] Int. Cl.$^6$ .................................................. G11B 17/08

[52] U.S. Cl. ........................................ 360/98.05; 360/69

[58] Field of Search ............................. 360/69, 71, 72.3, 360/78.03, 91, 92, 95, 98.04, 98.05; 369/34, 35, 39

[56] References Cited

U.S. PATENT DOCUMENTS

| | | | |
|---|---|---|---|
| 5,513,156 | 4/1996 | Hanaoka et al. | 360/98.05 X |
| 5,548,567 | 8/1996 | Sawai | 360/98.05 X |
| 5,638,347 | 6/1997 | Baca et al. | 360/98.04 |
| 5,659,434 | 8/1997 | Yamakawa et al. | 360/98.05 X |

Primary Examiner—Muhammad N. Edun
Attorney, Agent, or Firm—Staas & Halsey

[57] ABSTRACT

An MPU of a second subcontroller in a library apparatus executes an intra-memory apparatus construction data creation program, thereby controlling operations of an accessor and of a bar code reader. Unit construction data is thereby obtained from a bar code label attached to each unit. It is therefore feasible to automatically input the data about a position where a drum unit is disposed, and the number of magnetic tape cartridges that can be housed in the drum unit.

8 Claims, 12 Drawing Sheets

FIG. 5

| FIRST WORD | SECOND WORD | THIRD WORD | FOURTH WORD | FIFTH WORD | SIXTH WORD |
|---|---|---|---|---|---|
| TYPE CODE | OPTION CODE (Z=0) | FRAME | CODE | CONFIG TYPE | OPTION CODE (Z=1) |
| Byte 0 | | Byte 1 | | Byte 2 | |

FIG. 9

| OPTION CODE | KIND OF ROCKER | TYPE CODE (BIN) | REMARKS |
|---|---|---|---|
| 0 0 0 0 | A32(RAU) RIGHT ACC GARAGE FRAME (R/CAS MOUNTED) | 0 0 | SET THAT WALL CELL EXIST IN 1-ACC MODEL |
|  |  | 0 1 | SET THAT WALL CELL EXISTS IN -1-ACC MODEL AND -2-ACC MODEL |
| 0 0 0 1 | CEL WELL CELL PACKAGING | 0 0 | NOT CONNECTED ADJACENT TO RAU/LAU WHEN IN -1-ACC MODEL AND -2-ACC MODEL |
|  |  | 0 1 | CONNECTED TO LEFT ADJACENT TO RAU IN 2-ACC MODEL |
|  |  | 1 0 | CONNECTED RIGHT ADJACENT TO LAU IN 2-ACC MODEL |
| 0 0 1 0 | DR (NO DRUM DEE) PACKAGE DRUM CELL AND WALL CELL (WALL CELL IS TYPE = 00, 01, 10) | 0 0 | NOT CONNECTED ADJACENT TO RAU/LAU WHEN IN -1-ACC MODEL AND -2-ACC MODEL |
|  |  | 0 1 | CONNECTED LEFT ADJACENT TO RAU IN 2-ACC MODEL |
|  |  | 1 0 | CONNECTED TO RIGHT ADJACENT TO LAU IN 2-ACC MODEL |
|  |  | 1 1 | SET THAT NO WALL CELL EXISTS BOTH IN 1-ACC/2 AND IN 2-ACC |

| NAME OF FLAME | FLAME CODE (HEX) | TYPE CODE = 00 | TYPE CODE = 01 | TYPE CODE = 10 | TYPE CODE = 11 |
|---|---|---|---|---|---|
| A32 (RAU) | 01 | ACC R/CAS (Z=0 SURFACE / Z=1 SURFACE) | ACC R/CAS (Z=0 SURFACE / Z=1 SURFACE) | RESERVE | RESERVE |
| CEL | 16-1F 31-3A | Z=0 SURFACE / Z=1 SURFACE | Z=0 SURFACE / Z=1 SURFACE | Z=0 SURFACE / Z=1 SURFACE | RESERVE |
| DAU1 | 16-1F 31-3A | Z=0 SURFACE / Z=1 SURFACE | Z=0 SURFACE / Z=1 SURFACE | Z=0 SURFACE / Z=1 SURFACE | Z=0 SURFACE / Z=1 SURFACE |
| DR/DM | 16-1F 31-3A | Z=0 SURFACE / Z=1 SURFACE | Z=0 SURFACE / Z=1 SURFACE | Z=0 SURFACE / Z=1 SURFACE | Z=0 SURFACE / Z=1 SURFACE |
| TAU1 | 21 | F6476 (Z=0 SURFACE / Z=1 SURFACE) | RESERVE | F6476 (Z=0 SURFACE / Z=1 SURFACE) | F6476 (Z=0 SURFACE / Z=1 SURFACE) |
| TAU1 | 22-28 | F6476 (Z=0 SURFACE / Z=1 SURFACE) | RESERVE | F6476 (Z=0 SURFACE / Z=1 SURFACE) | F6476 (Z=0 SURFACE / Z=1 SURFACE) |

| FLAME NAME | FLAME CODE (HEX) | CONFIG TYPE=00 | | CONFIG TYPE=01 | | CONFIG TYPE=10 | | CONFIG TYPE=11 | |
|---|---|---|---|---|---|---|---|---|---|
| DR/DM TYPE CODE=00 | 16-1F 31-3A CODE=00 | Z=0 SURFACE | Z=1 SURFACE | Z=0 SURFACE | Z=1 SERFACE | Z=0 SURFACE | Z=1 SURFACE | Z=0 SURFACE | Z=1 SURFACE |
| DR/DM TYPE CODE=01 | 16-1F 31-3A CODE=01 | Z=0 SERFACE | Z=1 SURFACE | Z=0 SURFACE | Z=1 SERFACE | Z=0 SERFACE | Z=1 SURFACE | Z=0 SURFACE | Z=1 SERFACE |
| DR/DM TYPE CODE=10 | 16-1F 31-3A CODE=10 | Z=0 SURFACE | Z=1 SURFACE | Z=0 SURFACE | Z=1 SERFACE | Z=0 SERFACE | Z=1 SURFACE | Z=0 SURFACE | Z=1 SERFACE |
| DR/DM TYPE CODE=11 | 16-1F 31-3A CODE=11 | Z=0 SURFACE | Z=1 SERFACE | Z=0 SURFACE | Z=1 SERFACE | Z=0 SERFACE | Z=1 SURFACE | Z=0 SURFACE | Z=1 SERFACE |

|  | Bit 0 ($2^7$) | Bit 1 ($2^6$) | Bit 2 ($2^5$) | Bit 3 ($2^4$) | Bit 4 ($2^3$) | Bit 5 ($2^2$) | Bit 6 ($2^1$) | Bit 7 ($2^0$) |
|---|---|---|---|---|---|---|---|---|
| BYTE 0 | FLAG | | | | | Z ADDRESS | | |
| BYTE 1 | Y ADDRESS | | | | | | | |
| BYTE 1 | FLAME CODE | | | | | | | |
| BYTE 2 | X ADDRESS | | | | | | | |

37

(b)

| BIT0 | BIT1 | ATTRIBUTE |
|---|---|---|
| 0 | 0 | RESERVE |
| 0 | 1 | CAS ENTRY/EXIT |
| 1 | 0 | MTU ENTRY/EXIT |
| 1 | 1 | ORDINARY CELL |

LIBRARY APPARATUS

BACKGROUND OF THE INVENTION

The present invention relates to a library apparatus for housing large-capacity recording mediums and executing recording/reproducing processes on and from each recording medium in accordance with a command issued from a host computer.

With a development in technology of processing information over recent years, there have been demands for a much larger capacity of a recordable data quantity, saving a labor for recording and reproducing the data, and automation of recording and reproducing the data. There is increased a need for a library apparatus for executing recording/reproducing processes on and from the recording medium as one of apparatuses responding to those demands, and a construction of the apparatus is becoming large in scale.

The library apparatus is roughly constructed in the manner which follows. To be specific, a plurality of box-shaped units are connected on both sides along one travelling path (a rail). A carrying device (referred to as an "accessor") for carrying a magnetic tape defined as a recording medium is installed on the traveling path. The plurality of units include a unit (a housing unit) for housing the magnetic tape, a unit (a recording/reproducing unit) for housing a recording/reproducing device of the magnetic tape, and a unit (a control unit) for housing a controller of the accessor. Then, the controller is connected to a host computer for issuing a variety of commands to the library apparatus.

A rocker constructed of a plurality of cells is formed on a surface, facing to the traveling path, of the housing unit, and the magnetic tape is housed in each cell. Further, a slot is formed in a surface, facing to the traveling path, of the recording/reproducing unit. When the magnetic tape is inserted into the slot, the magnetic tape is loaded into the recording/reproducing device, and data is recorded on or reproduced from the magnetic tape. The accessor fetches the magnetic tape from an appropriate cell of the housing unit in accordance with a drive command generated by the controller, and performs an operation of carrying the magnetic tape to other cell and the recording/reproducing unit, or an operation of carrying again to an appropriate cell the magnetic tape on and from which the recording/reproducing processes have been done.

It is required that the magnetic tape be properly carried by the accessor between the units in accordance with the command from the controller in order for the library apparatus to be properly operated based on the command issued from the host computer. For attaining this, the controller of the accessor must hold the data about a total number of the units, kinds of the respective units, positions where the units are disposed, the number of cells housed in the housing units, and positions of the cells, and must generate commands based on these pieces of data.

The library apparatus is, however, capable of arbitrarily setting a recording medium activity quantity (a housing quantity) and a recording/reproducing processing capability by connecting a corresponding number of housing units to a scale of a computer system using the library apparatus and an appropriate number of recording/reproducing units. Hence, there is no fixed type of unit construction in the library apparatus. Accordingly, it is impossible to adopt a method by which the controller previously holds the data about the total number of units, the kinds of units, the disposing positions of the units pursuant to the fixed type of unit construction, the number of cells housed in the housing units and the positions of the cells, and generates the drive command of the accessor on the basis of these pieces of data.

From the reason elucidated above, according to the prior art, on the occasion of installing the library apparatus, the units connected are disposed on both sides of the travelling path, and thereafter a manager of the library apparatus carries out, e.g., an operation which follows. Specifically, the manager inputs the data about the total number of units, the kinds of units, the disposing positions of units, the number of cells housed in the housing units and the positions of cells, to a portable data storage device known as an operation panel with reference to a manual (specifications) of the library apparatus. Subsequently, the manager visually observes each housing unit or each recording/reproducing unit, and thus confirms whether the data inputted to the operation panel are correct or not. Then, the manager stores the data recorded on the operation panel in a nonvolatile memory mounted in the controller of the accessor. After such an operation, the controller of the accessor executes control of the operation of the accessor by use of the data stored in the nonvolatile memory, thereby operating the library apparatus.

The above-described operation by the manager is, however, remarkably troublesome and time-consuming as well, and depends on a manual operation. It is therefore quite difficult to request a perfect accuracy. On the other hand, an input mistake of the data recorded on the operation panel might exert a direct influence upon a performance and safety of the library apparatus. Hence, it is almost impossible to precisely input the data in a short time. Accordingly, there arises a problem in which a comparatively long time is needed for installing the library apparatus.

SUMMARY OF THE INVENTION

It is a primary object of the present invention, which was contrived in views of the problems given above, to provide a library apparatus capable of being installed easier in a shorter time than by the prior art.

To obviate the above problems, the present invention adopts the following construction. Namely, according to a first aspect of the present invention, a library apparatus comprises one traveling path on which a carrying device which carries a recording medium travels, a housing unit disposed on a side of the traveling path, said housing unit housing a plurality of recording mediums, a data retainer provided with a surface of said housing unit facing to the carrying device, said data retainer retaining construction data indicating construction of the housing unit, a data reader provided with the carrying device, said data reader reading the construction data retained on the data retainer, and a controller controlling operations of said carring device and of said data reader, obtaining the construction data of the housing unit from the data retainer through the data reader.

According to the first aspect of the present invention, the construction data of the housing unit is obtained from the data retainer by the controller controlling the operation of the data reader. Accordingly, it is possible to automatically input the construction data of the housing unit, which has hitherto been done by a manual operation.

Herein, the construction data of the housing unit may be data showing the number of the recording mediums that can be housed in the housing unit and may also be, if the housing unit houses a rocker for storing a plurality of recording mediums, a kind of the rocker housed in the housing unit. Further, the data retained on the data retainer may be the construction data itself of the housing unit or may be a code indicating the construction data of the housing unit.

Moreover, for instance, a ber code label may be given as a data retainer, and, e.g., a ber code reader may be given as a data reader.

According to a second aspect of the present invention, A library apparatus comprises one traveling path on which a carrying device which carries a recording medium travels, a plurality of units disposed on at least one side of the traveling path, a data retainer provided with a surface of each of the unit facing to the carrying device, each of the data retainer retaining construction data indicating construction of a unit corresponding to the data retainer, a data reader provided with the carrying device, the data reader reading the construction data retained each of the data retainer, a controller controlling operations of the carrying device and of the data reader, obtaining the construction data from each of the data retainer through the data reader, and a processor generating construction data indicating of the library apparatus on the basis of the construction data which obtained by the processor.

Herein, the construction data of the library apparatus may be data comprising the number of the units. The construction data of the library apparatus may be data comprising position data indicating a position of each of the unit.

Further, any one of the units may be a housing unit housing a rocker which comprises a plurality of cells for accomodating a recording mediums, and the construction data of the library apparatus may be comprising position data indicating a position of each of the cell.

Further, it is desirable that the controlling unit be constructed to operate the carrying device so that the data retaining member is set in a face-to-face relationship with the reading unit, and to advance the reading unit toward the retaining member in order to read the construction data of the housing unit from the data retaining member.

Moreover, the library apparatus according to the present invention further comprises a recording/reproducing unit, disposed on at least one side of the traveling path, for housing a recording/reproducing device for recording and reproducing data on and from a plurality of recording mediums, and a second data retaining member, provided on a surface, facing to a carrying device, of the recording/reproducing unit, for retaining construction data of the recording/reproducing unit. The controlling unit may also be constructed to obtain the construction data of the respective units from the second data retaining member as well as from the data retaining member, to create apparatus construction data defined as construction data of the whole library apparatus on the basis of the obtained unit construction data, and to operate the carrying device based on the thus created apparatus construction data.

The library apparatus according to the present invention is capable of being installed easier in a shorter time than by the prior art and therefore saving labors when installing the library apparatus itself.

BRIEF DESCRIPTION OF THE DRAWINGS

Other objects and advantages of the present invention will become apparent during the following discussion in conjunction with the accompanying drawings, in which:

FIG. 5 is an explanatory chart of a bar code label;

FIG. 9 is an explanatory chart showing an option code table;

FIG. 10 is an explanatory chart showing a frame code table;

FIG. 11 is an explanatory chart sowing a config type table; and

FIG. 12 is an explanatory chart showing a cell address table.

DETAILED DESCRIPTION OF THE PREFERRED EMBODIMENT

A preferred embodiment of the present invention will hereinafter be described with reference to the accompanying drawings.

<Mechanical Construction of Library Apparatus>

Figure 1:
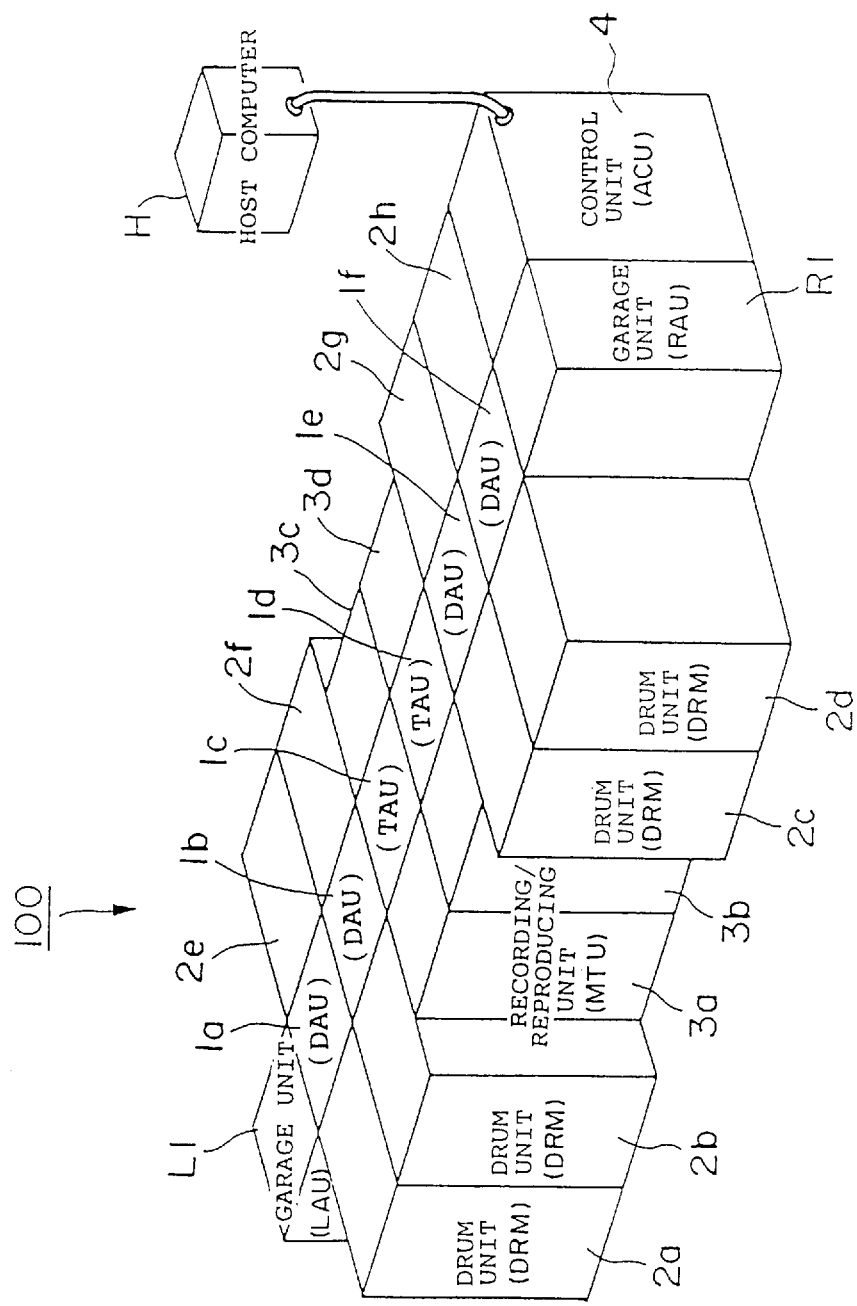
FIG. 1 is a view showing a construction and an external appearance of a library apparatus.

To start with, a mechanical construction of a library apparatus 100 in accordance with the present embodiment will be described. FIG. 1 is a view illustrating a configuration of an external appearance of the library apparatus 100 in this embodiment. Referring to FIG. 1, the library apparatus 100 is classified as a middle/large-sized library apparatus and is constructed of a plurality of box-shaped units connected to each other.

To be specific, the library apparatus 100 comprises a passageway units 1a–1f arranged on the same straight line and connected to each other, garage units L1 (LAU: Left Accessor Unit) and R1 (RAU: Right Accessor Unit) connected respectively to edge portions of the passageway units 1a–1f, drum units (DRM: Drum unit) 2a –2d connected respectively to one side edges (substantially left edges in FIG. 1) of the passageway units 1a–1f, recording/reproducing units (MTU: Magnetic Tape Unit) 3a, 3b connected likewise to the one side edges thereof, drum units 2e–2h connected respectively to the other side edges (substantially right edges in FIG. 1) of the passageway units 1a–1f, recording/reproducing units 3c, 3d connected likewise to the other side edges thereof, and a control unit (ACU: Accessor Control Unit) 4 connected to the garage unit R1 and the drum unit 2h. Then, a host computer H is connected via a communication line to the control unit 4.

Figure 2:
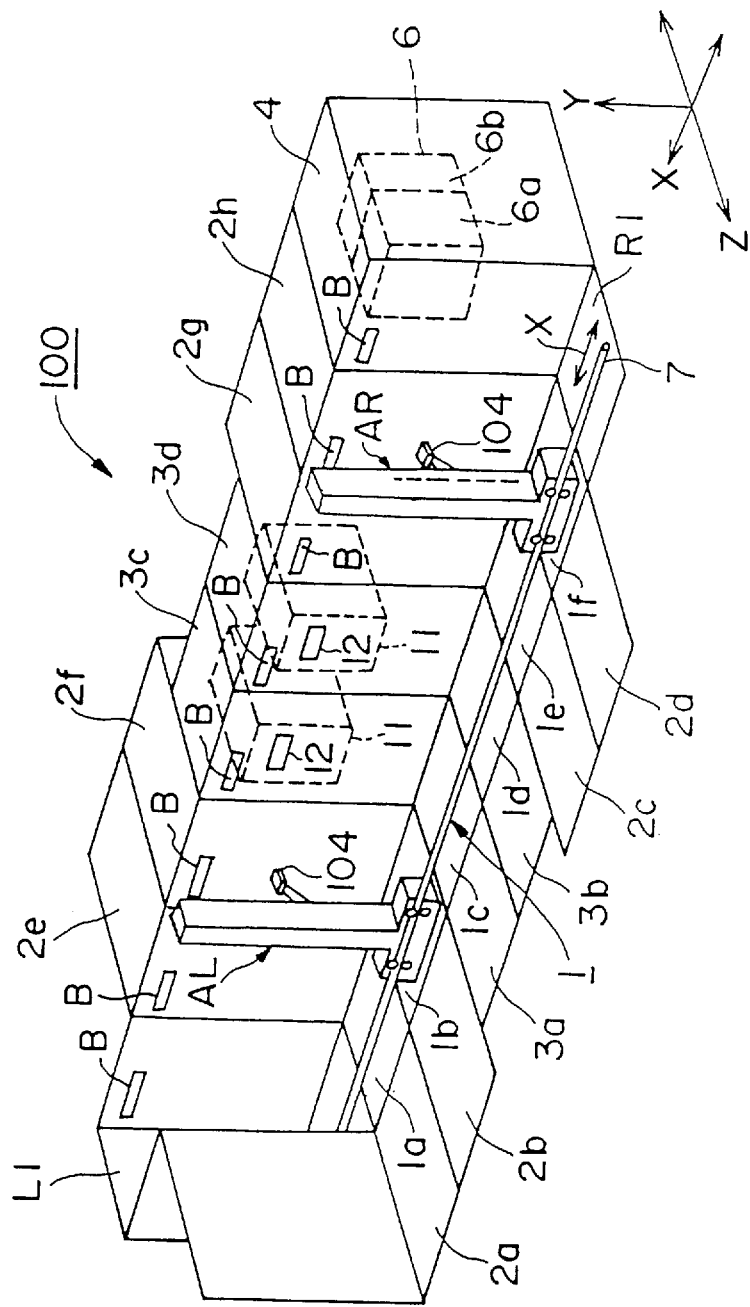
FIG. 2 is a view illustrating an internal configuration of the library apparatus.

FIG. 2 is a partial perspective view of the library apparatus 100 illustrated in FIG. 1. Referring to FIG. 2, each of the passageway units 1a–1f has a hollow interior excluding bottom and top plates. One internal space communicating with the passageway units 1a–1f is therefore formed. This internal space is formed with a passageway 1 for two accessors AL and AR defined as carrier devices of a magnetic tape (corresponding to a recording medium). The passageway units 1a–1f comprises four drum attach units (DRU) for connecting two drum units and two tape attach units (TAU) for connecting two recording/reproducing units.

The garage unit L1 is connected to the passageway unit 1a and functions as a housing unit for the accessor AL. Further, the garage unit R1 is connected to the passageway unit 1f and functions as a housing unit for the accessor AR. Each of the garage units L1, R1 has an hollow interior, and these internal spaces communicate with the internal space serving as the passageway 1 within the passageway units 1a–1f.

Figure 3:
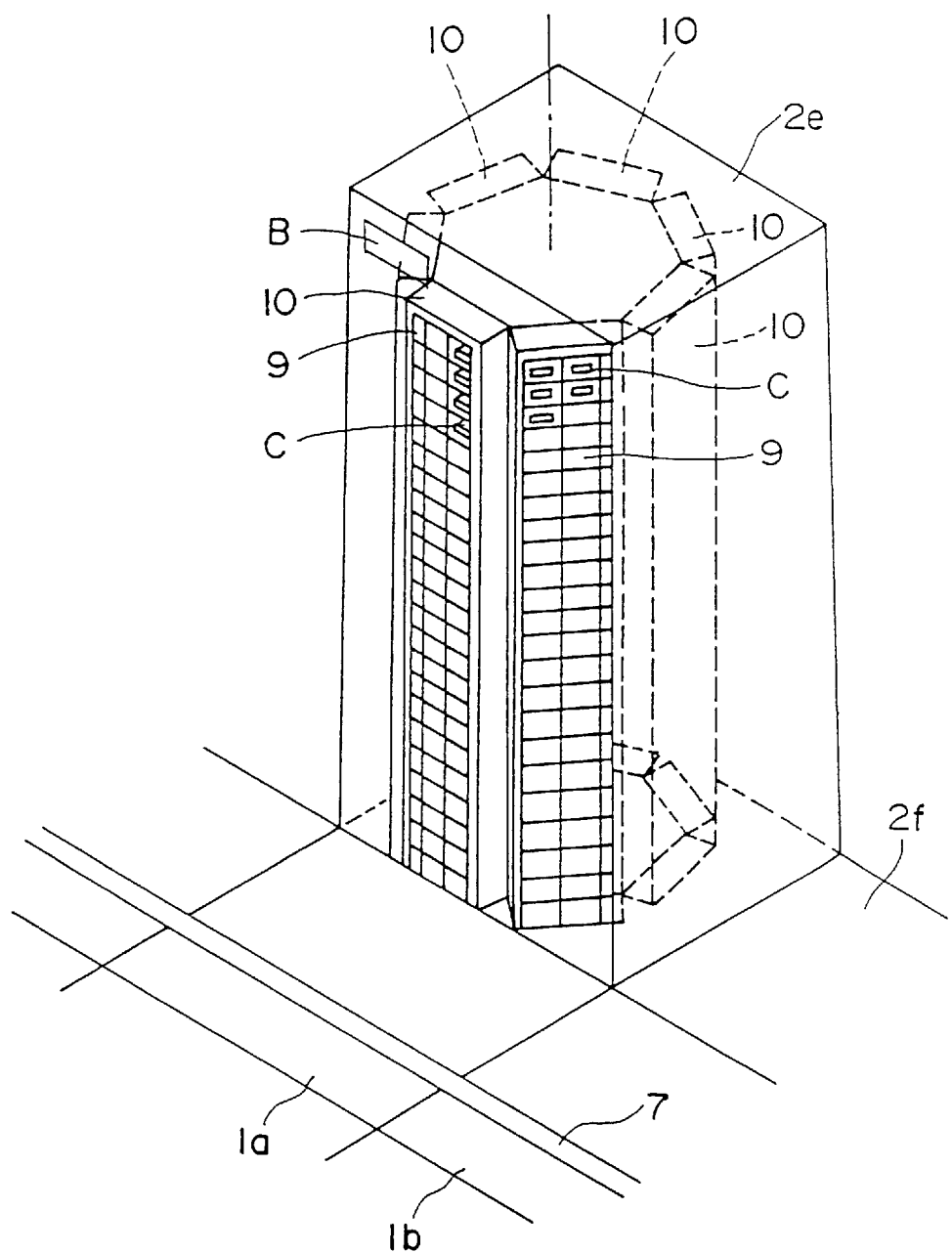
FIG. 3 is a view illustrating a construction of a drum unit.

Each of the drum units 2a–2h (corresponding to housing units) houses a multiplicity of magnetic tapes. FIG. 3 is a schematic view showing an example of an internal structure of each of the drum units 2a–2h. Each of the drum units 2a–2h in this embodiment has the same construction. Therefore, the drum unit 2e will be exemplified.

Referring to FIG. 3, the drum unit 2e houses a drum 8 taking a substantially septenary prismatic shape. The drum 8 is disposed with its central axis directed in a perpendicular direction and is rotatable about this central axis serving as a rotary axis. A rocker 10 consisting of cells 9 arrayed in a plurality of rows and in a plurality of columns is formed on each side surface of the drum 8. A cartridge C loaded with the magnetic tape is housed in each cell 9. The drum 8 stops rotating in a state where a front surface of any one of the rockers 10 is directed to the passageway unit 1a, and the front surface of this rocker 10 is exposed to the internal space forming the passageway 1. The rocker 10 facing to this passageway unit 1a is properly changed with a rotation of the drum 8.

As illustrated in FIG. 2, each of the recording/reproducing units 3a–3d houses a recording/reproducing device 11 of the magnetic tape. A slot 12 for inserting or ejecting the cartridge C is formed in a passageway-sided partition wall, facing to the passageway 1, of each of the recording/reproducing units 3a–3d. When the cartridge C is inserted into the slot 12, the cartridge C is loaded into the recording/reproducing device 11. The recording/reproducing device 11, when loaded with the cartridge C, records or reproduces data on or from the magnetic tape set in the cartridge C. Then, upon finishing the record or reproduction of the data, the recording/reproducing device 9 ejects the cartridge C into a state where the cartridge C springs halfway out of the slot 12.

A single rectilinear guide rail 7 (corresponding to a traveling path) is extended along an X-axis disposed within the horizontal plane over to the garage unit R1 from the garage unit L1 through the interiors of the garage units L1, R1 and the passageway units 1a–1f. The accessors AL and AR are attached to this guide rail 7. The accessors AL and AR are capable of traveling in the direction (a direction X in FIG. 2) along the guide rail 7.

Herein, in this embodiment, a position of the accessor AL when housed in the garage unit L1 is set as an initial position (a home position) of the accessor AL. A position of the accessor AR when housed in the garage unit R1 is set as an initial position (a home position) of the accessor AR. Further, the accessor AL is movable up to positions facing to the drum units 2d, 2h from the home position, while the accessor AR is movable up to positions facing to the drum units 2a, 2e from within the garage unit R1.

Figure 4:
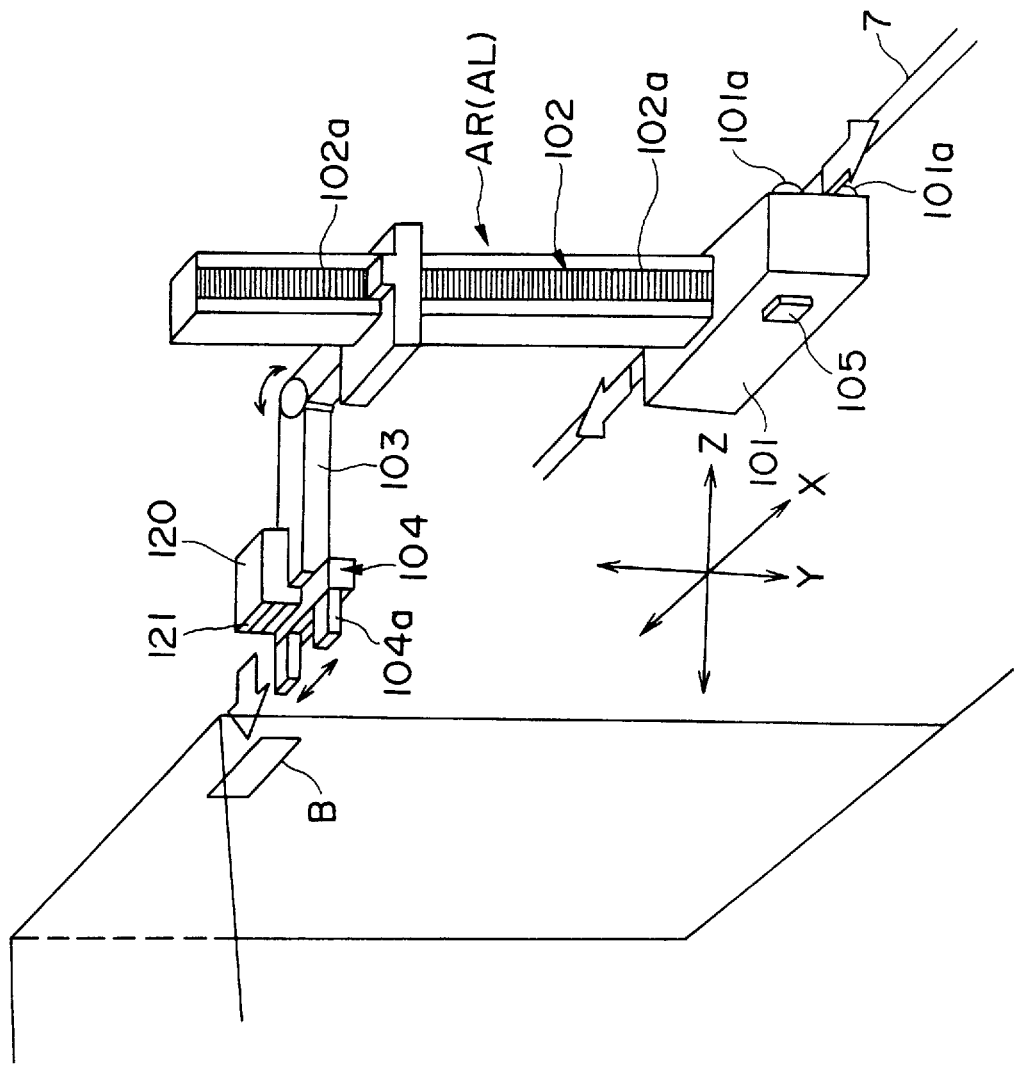
FIG. 4 is a view showing a construction of an accessor.

FIG. 4 is a schematic view illustrating a construction of the accessor AL or AR. The accessors AL and AR have the same construction, and hence the accessor AR is herein exemplified. Referring to FIG. 4, the accessor AR comprises a traveling member 101, a support 102, and arm 103 and a picker 104 of the cartridge C. The traveling member 101 has two pairs of rollers 101a disposed in a face-to-face relationship with the drum units 2a–2d and the recording/reproducing units 3a, 3b. Each pair of rollers 101a seizes the guide rail 7 in the perpendicular direction, thereby securing the traveling member 101 to the guide rail 7. Then, the respective rollers 101a rotate, whereby the accessor AR moves along the guide rail 7.

Further, the support 102 is formed integrally with the traveling member 101, and a central axis of the support 102 is disposed in the perpendicular direction (a direction Y in FIG. 4). The arm 103 extends in the horizontal direction from the side surface of the support 102, and the picker is attached to a terminal of the arm 103.

The arm 103 moves in the direction Y with the aid of a column 102a formed on the support 102. Further, the arm 103 rotates through 180° within the X-Z plane from a state where the picker 104 faces to one side surface of the passageway 1 to a state where the picker 104 faces to the side surface thereof. The direction Z is herein a direction along a Z-axis orthogonal to the X- and Y-axes, and the X-Z plane is a horizontal plane containing the X- and Z-axes. The picker 104 thereby becomes possible of facing to all of the drum units 2a–2h and the recording/reproducing units 3a–3d. The picker 104 has a hand 104a for grasping the cartridge C. The hand 104a is movable to and fro in the direction Z in FIG. 4.

Further, the accessor AR is provided with a motor unit 105 constructed of a plurality of motors and actuators. This motor unit 105 is driven to execute an operation of the accessor AR traveling along the guide rail 7, and operation of the arm 103 moving in the direction Y, an operation of the arm 103 rotating within the X-Z plane, an operation of the hand 104a moving to and fro in the direction Z, and an operation of the hand 104a opening and closing.

With the construction described above, the accessor AR is capable of carrying all the cartridges C housed in the drum units 2a–2h or the recording/reproducing units 3a–3d.

The accessors AL and AR operate in accordance with a command given from the host computer H. For example, when the host computer H issues a command purporting that recording/reproducing processes be executed by the accessor AR with respect to a specified cartridge C, the accessor AR operates as follows.

At the first onset, the accessor AR travels in the direction X to a position in front of a predetermined drum unit (e.g., the drum unit 2d) accommodating the specified cartridge C. Subsequently, the arm 103 of the accessor AR rotates within the X-Z plane so that the picker 104 faces to the rocker 10 housing the specified cartridge C. Subsequently, the arm 103 moves in the direction Y so that the picker 104 is positioned in front of the cell 9 housing the specified cartridge C. Subsequent to this operation, the hand 104a of the picker 104 moves forward into the cell 9 and catches the specified cartridge C and moves back to the previous position.

Subsequently, the accessor AR travels in the direction X to a position in front of a predetermined recording/reproducing unit (e.g., the recording/reproducing unit 3d). Subsequently, the arm 103 rotates within the X-Z plane so that the picker 104 faces to the recording/reproducing unit 3d. Then, the arm 103 moves in the direction Y so that the picker 104 is positioned in front of the slot 12 of the recording/reproducing unit 3d. Subsequently, the hand 104a moves forward to the slot 12, inserts the specified cartridge C into the slot 12, and releases the same cartridge C therein. Finally, the hand 104a moves back to the previous position.

<Bar Code>

As illustrated in FIG. 2, bar code labels recorded with construction data (unit construction data) of the respective units are attached in the same height positions to the surfaces, facing to the passageway 1, of the respective housing units 2e–2h and of the recording/reproducing units 3c, 3d, an internal wall surface, flush therewith, of the garage unit L1, and an internal wall surface (a connecting surface with the control unit 4) of the garage unit R1.

FIG. 5 is an explanatory chart showing data recorded on each bar code label B. Referring to FIG. 4, the bar code label B has a 3-byte capacity enough to record the unit construction data of the unit (identified by Z=0) attached with the bar code label B, and the unit construction data of the unit (identified by Z=1) existing in a position facing to the unit (Z=0) with the passageway 1 interposed therebetween. For instance, the bar code label B attached to the drum unit 2e is recorded with the unit construction data of the drum unit 2e and the unit construction data of the drum unit 2a.

More specifically, the bar code label B has six 4-bit storage areas, wherein a type code is stored in the area of a first word, an option code is stored in the area of a second word, a frame code is stored in the areas of third and fourth words, a config type is stored in the area of a fifth word, and an option code is stored in the area of a sixth word. The option code stored in the second word area is an option code of the unit (Z=0) to which the bar code label is attached, and the option code stored in the sixth word area is an option code of the unit (Z=1) existing in the position facing to the unit (Z=0).

Herein, the option code is defined as data indicating a kind of the unit, whereby the unit can be classified into one of the garage unit, the drum unit, the recording/reproducing unit and the control unit. Further, the option code is also defined as data showing the number of cartridges C possible of being housed into the drum unit. The type code is defined as data indicating a type of each unit as well as showing what kind of other unit is connectable to the relevant unit, and what positional relationship the relevant unit is connected to other units. The frame code is defined as data showing an identification of each unit, i.e., a status in which each of the unit attached with the bar code label B and the unit facing thereto with the passageway unit interposed therebetween. Then, the config type is defined as data showing a disposition of the unit, i.e., a disposition of each of the unit attached with the bar code label B and the unit facing thereto with the passageway unit interposed therebetween.

Note that each bar code label B in this embodiment may be, though attached when manufacturing each unit, attached to each of the units on the occasion of installing the library apparatus 100.

<Bar Code Reader>

As illustrated in FIG. 4, each of the accessors AR, AL is provided with a bar code reader 120. That is to say, the bar code reader 120 is secured to the picker 104 in such a state that its reading surface 121 can be set facing to each bar code label B. The bar code reader 120 is movable to and fro in the direction Z by driving the motor unit 105 as in the case of the hand 104a.

<Controller>

Next, a controller 6 of the library apparatus 100 will be explained. As shown in FIG. 2, the control unit 4 accommodates the controller 6 of the accessors AL and AR. The controller 6 comprises two-system subcontrollers, i.e., a first subcontroller 6a for controlling the operation of the accessor AL and a second subcontroller 6b for controlling the operation of the accessor AR. These first and second subcontrollers 6a, 6b have the same construction, and hence only the second subcontroller 6b will be explained while omitting the explanation of the first subcontroller 6a.

Figure 6:
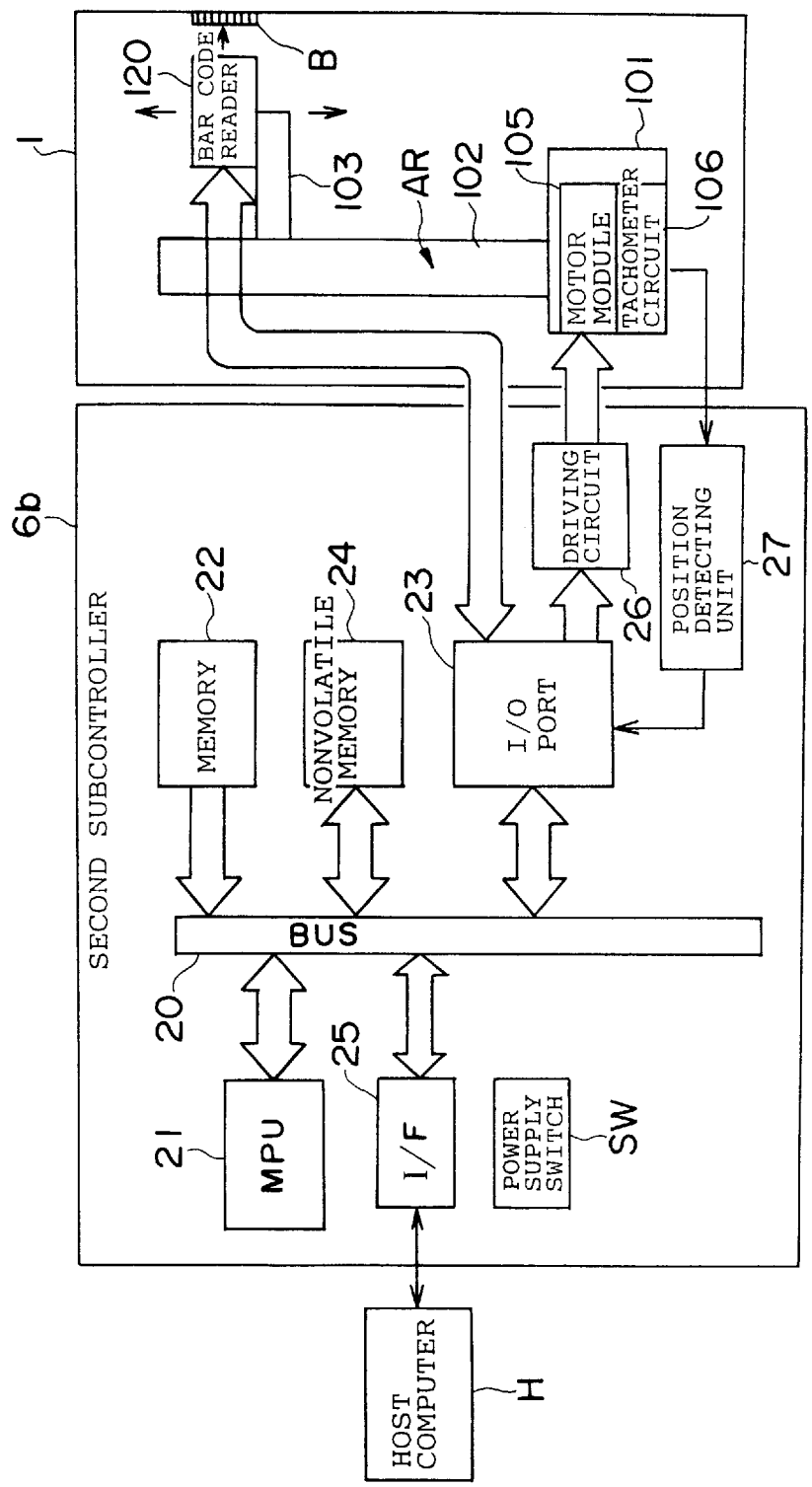
FIG. 6 is a diagram showing a construction of a controller.

FIG. 6 is an explanatory diagram illustrating a construction of the controller 6 (only the second subcontroller 6b) and a state of connection with the accessor AR. Referring to FIG. 6, the second subcontroller 6b is comprised an MPU (Micro Processing Unit) 21, a memory 22, an I/O (Input/Output) port 23, a nonvolatile memory 24 and an interface circuit 25 which are connected to each other via a bus 20, a driving circuit 26 and a position detecting unit 27 which are connected via a signal line to the I/O port 23, and a power supply switch SW.

Herein, the memory 22 is constructed of a ROM (Read Only Memory) recorded with an apparatus construction data creation program, an operation control program of the accessor AR and data used when executing, and a RAM (Random Access Memory) serving as an operating domain of the MPU 21.

The I/O port 23 receives a drive command of the motor unit 105 and transfers it to the driving circuit 26. Further, the I/O port 23 receives data on an absolute position of the accessor AR and transfers it to the MPU 21. Moreover, the I/O port 23, which is connected via the signal line to the bar code reader 120 of the accessor AR, receives the data read out by the bar code reader 120 and transfers the same data to the MPU 21.

The driving circuit 26 supplies the motor unit 105 with driving electric power based on the drive command received from the I/O port 23. Thereupon, any one of the motors constituting the motor unit 105 is driven corresponding to the driving electric power. Performed thereby are an operation of the accessor AR traveling along the guide rail 7 (in the direction X), an operation of the arm 103 moving in the direction Y, or an operation of the hand 104a or the bar code reader 120 moving to and fro in the direction Z. This motor unit 105 is fitted with a tachometer circuit 106.

The tachometer circuit 106 is classified as an incremental type encoder provided corresponding to each of the motors constituting the motor unit 105, and emits pulses showing a quantity of rotations of each motor. This tachometer circuit 106 is connected via the signal line to the position detecting unit 27, and the pulses emitted from the tachometer circuit 106 are inputted to the position detecting unit 27.

The position detecting unit 27 is constructed of a counter for counting per motor the number of pulses inputted from the tachometer circuit 106, and an address converting circuit for calculating the absolute position of the accessor AR (the arm 103, the picker 104 and the bar code reader 120) on the basis of the counted number of pulses. Explained is a case in which, for instance, the position detecting unit 27 detects an X-directional absolute position of the accessor AR.

The counter of the position detecting unit 27 is reset when the accessor AR is housed in the garage unit R1 (when existing in the home position), and counts up each time a pulse indicating a forward rotation of the motor that drives the accessor AR to travel toward the garage unit L1 in the direction X is inputted. This counter counts down each time a pulse indicating a reverse rotation of the motor that drives the accessor AR toward the garage unit R1 in the direction X is inputted.

The address converting circuit contains an absolute position of an X-directional origin (X=0, i.e., a home position) of the accessor AR and a movement quantity of the accessor AR that corresponds to one pulse, and calculates the X-directional absolute position of the accessor AR that corresponds to the number of pulses counted by the counter on the basis of these items of data. The data on this absolute position is supplied to the MPU 21 via the I/O port 23.

Thus, with the aid of the tachometer circuit 106 and the position detecting unit 27, the MPU 21 is capable of holding the respective absolute positions of the accessor AR, the arm 103, the picker 104 and the bar code reader 120.

The nonvolatile memory 24 is constructed by use of a flash memory and EEPROM (Electrically Erasable Programmable ROM) etc. This nonvolatile memory 24 is stored with the apparatus construction data of the library apparatus 100 and address data of the respective cells 9 in the drum units 2a–2h of the library apparatus 100.

The interface circuit 25, which is connected via a communication line to the host computer H, receives a variety of commands issued from the host computer H to the library apparatus 100, and supplies the MPU 21 with these commands. The host computer H sends to the MPU 21, e.g., a movement command (a recording/reproducing command of the magnetic tape housed in the cartridge C) of the cartridge C.

The MPU 21 executes roughly two processes. First, the MPU 21 creates the apparatus construction data of the library apparatus 100 by executing the apparatus construction data creation program recorded on the memory 22, and executes a process of storing the nonvolatile memory 24 with the same data. Second, the MPU 21 executes a process (an operation control process of the accessor AR) of controlling the operation of the accessor AR by executing the operation control program of the accessor AR in response to the command given from the host computer H.

<Apparatus Construction Data Creating Process>

Next, an apparatus construction data creating process by the MPU 21 will be explained. The library apparatus 100 described above is installed in the procedures which follow. Namely, to begin with, the passageway units 1a–1f, the garage units L1, the garage unit R1, the drum units 2a–2h, the recording/reproducing units 3a–3d and the control unit 4 are connected in the manner described above.

Subsequently, the guide rail 7 is extended through the interiors of the passageway units 1a–1f and of the garage units L1, R1, and the accessors AL, AR are secured to the guide rail 7. Thereafter, the MPU 21 executes the apparatus construction data creating process.

Figure 7:
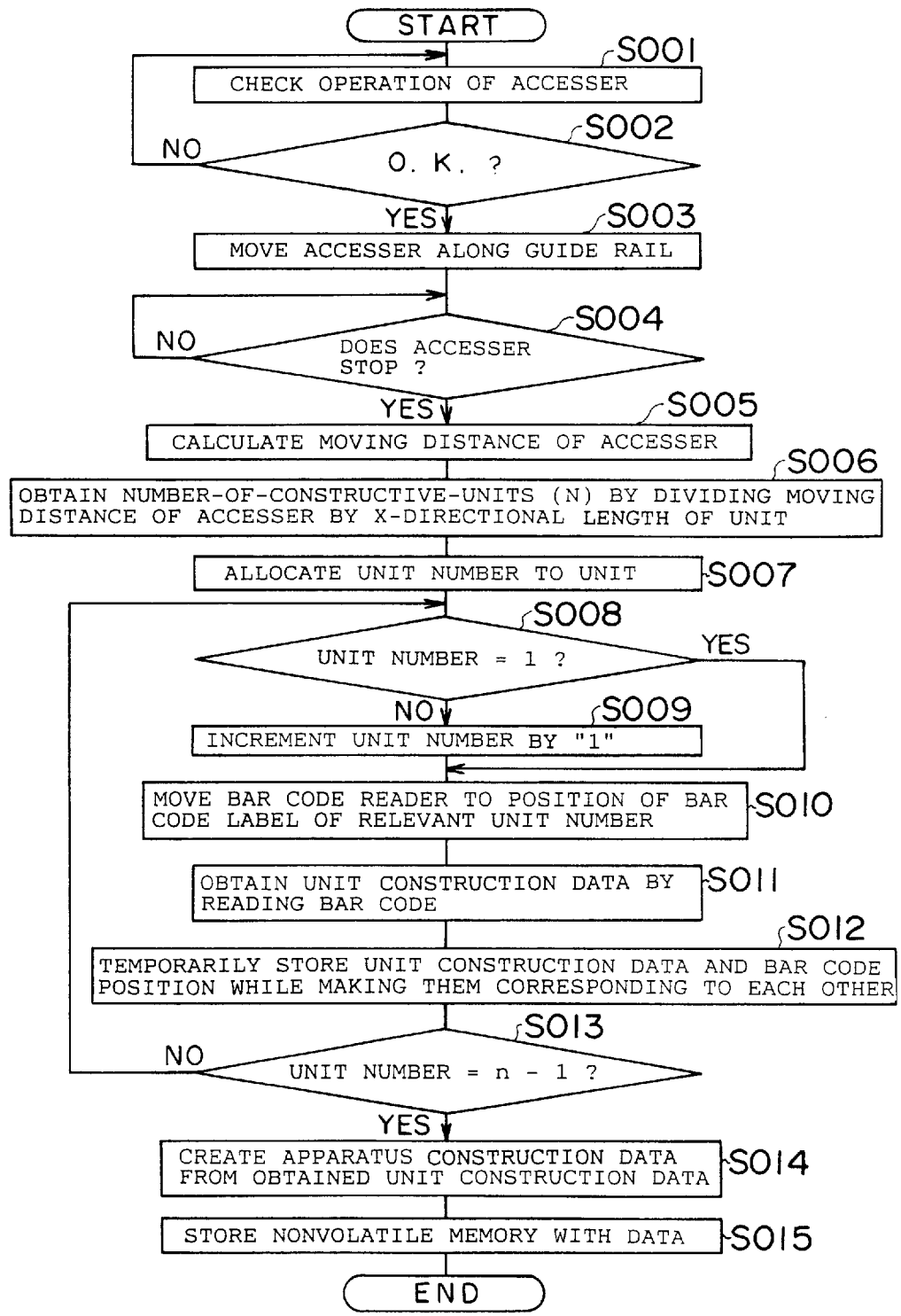
FIG. 7 is a flowchart showing an apparatus construction data creating process.

FIG. 7 is a flowchart showing the apparatus construction data creating process by the MPU 21. This process starts with an actuation of the MPU 21 upon switching ON the power supply switch SW of the second subcontroller 6b. This process is, however, based on the following premise. Namely, the memory 22 of the second subcontroller 6b is previously stored with unit construction data of the garage units L1, R1 and X-directional lengths these units. Further, all X-directional lengths of the garage units L1 and R1, the drum units 2a–2h and the recording/reproducing units 3a–3d have the same dimension. Moreover, the memory 22 is stored with a data of a position of the bar code label B with respect to each unit. Additionally, when starting the process, the accessors AL and AR are in the home positions. Furthermore, it is assumed that the bar code label B attached to the internal wall surface of the garage unit R1 is recorded with the unit construction data of the control unit 4.

Referring to FIG. 7, upon the start of the apparatus construction data creating process, the MPU 21 at fist generates a drive command for checking the operation of the accessor AR, and gives this command to the driving circuit 26 via the I/O port 23 (step S001). Thereafter, The MPU 21 makes the processing proceeds to step S002.

In the process in this step S001, the driving circuit 26 drives the motor unit 105. Thereupon, the accessor AR travels along the guide rail 7, and the arm 103, the picker 104, the hand 104a and the bar code reader 120 perform the operations for checking. The number of pulses of each motor of the motor unit 105 is thereby inputted to the position detecting unit 27 from the tachometer circuit 106, and the position detecting unit 27 supplies the MPU 21 with positional data (present positions) of the respective components of the accessor AR.

In step S002, the MPU 21 judges whether a result of checking the operation is desirable or not. More specifically, the MPU 21 receives the positional data of each unit component of the accessor AR from the position detecting unit 27, and judges whether or not the operation of the accessor AR falls within a normal range, thereby judging whether the check result is desirable or not. At this time, if the check result is not desirable, the MPU 21 returns the processing to step S001. Whereas if the check result is desirable, the MPU 21 moves the accessor AR to the home position and thereafter makes the processing proceed to step S003.

In step S003,, the MPU 21 moves the accessor AR toward the garage unit L1 from the home position. At this time, the MPU 21 moves the accessor AR at a low velocity so that the accessor AR might not collide with the accessor AL housed in the garage unit L1 enough to be damaged. Thereafter, the MPU 21 makes the processing proceed to step S004. In the process in step S003, the X-directional positional data of the accessor AR is inputted at any time to the MPU 21.

In step S004, the MPU 21 judges whether or not the accessor AR comes into contact with the accessor AL and then stops. That is, the MPU 21 judges whether or not there stops the change in the positional data of the accessor AR which is inputted from the position detecting unit 27. At this time, if the positional data does not stop changing, the MPU 21 assumes that the accessor AR does not stop moving, and repeatedly makes the judgement in step S004 till a YES judgement is made in step S004. Whereas if the change in the positional data halts, the MPU 21 presumes that the accessor AR stops moving, and make the processing proceed to step S005.

In step S005, the MPU 21 obtains a moving distance of the accessor AR. Namely, the MPU 21 obtains the moving distance of the accessor AR from the home position (X=0) of the accessor AR and the present position of the accessor AR, and adds the X-directional lengths of the garage units L1, R1 to the obtained moving distance, thereby obtaining an X-directional length of the library apparatus 100.

Subsequently, the MPU 21 divides the obtained X-directional length of the library apparatus 100 by each unit X-directional length read out from the memory 22 (step S007). The MPU 21 thereby obtains a number-of-constructive-units N (N=8 in this embodiment) of the library apparatus 100 in the direction X. That is, the MPU 21 obtains the number of units arranged in the direction along the guide rail 7, of which the library apparatus 100 is constructed. Further, the MPU 21 acquires the X-directional absolute position of each unit.

Then, the MPU 21 allocates unit numbers 1–N to the respective units existing on one side (a side of Z=0) of the passageway 1 sequentially from the garage unit R1 (step S007). To be specific, the MPU 21 allocates the unit number "1" to the control unit 4, the unit number "2" to the drum unit 2h, the unit number "3" to the drum unit 2g, the unit number "4" to the recording/reproducing unit 3d, the unit number "5" to the recording/reproducing unit 3c, the unit number "6" to the drum unit 2f, the unit number "7" to the drum unit 2e, and the unit number "8" to the garage unit L1. A unit number "0" is allocated to the garage unit R1. Subsequently, the MPU 21 stored a predetermined area of the memory 22 with the unit number "1", and thereafter makes the processing proceed to step S008.

In step S008, the MPU 21 judges whether or not the unit number stored in the predetermined area of the memory 22 is "1". At this time, if the unit number is "1", the MPU 21 makes the processing move forward to step S010. Whereas if the unit number is not "1", the MPU 21 increments the unit number by "1", which is stored in the predetermined area (step S009), and lets the processing proceed to step S010.

In step S010, the MPU 21 moves the bar code reader 120 of the accessor AR to a position of the bar code label B of the unit corresponding to the unit number stored in the predetermined area of the memory 22 at the present time. Namely, the MPU 21 gives the driving circuit 26 a drive command of the accessor AR on the basis of the positional data of the bar code label B that is previously recorded on the memory 22. The accessor AR is thereby moved, and the bar code reader 120 moves to the position facing to the relevant bar code label B.

Subsequently, the MPU 21 gives the driving circuit a drive command to advance the bar code reader 120, whereby the bar coder reader 120 advances toward the bar code label B. Then, the MPU 21 indicates the bar code reader 120 to read the unit construction data of the bar code label B. The unit construction data read by the bar code reader 120 is transmitted via the I/O port 23 to the MPU 21. The MPU 21 thereby acquires the unit construction data (step S011).

Then, the MPU 21 temporarily stores the memory 22 with the unit construction data acquired in step S011 and the position (the unit number corresponding to the bar code label B) of the bar code label B in such a format as to make them corresponding to each other (step S012). Thereafter, the MPU 21 advances the processing to step S013.

In step S013, the MPU 21 judges whether or not the unit number stored in the predetermined area of the memory 22 is "N−1" (N−1=7 in this embodiment). At this time, if the unit number is not "N−1", the MPU 21 assumes that the unit construction data of all the units are not obtained, and returns the processing to step S008. Then, the MPU 21 repeatedly executes the process in steps S008–S013 till the YES judgement is done in step S013. Whereas if the unit number is "N−1", the MPU 21 presumes that the unit construction data of all the units are obtained, and advances the processing to step S014.

Figure 8:
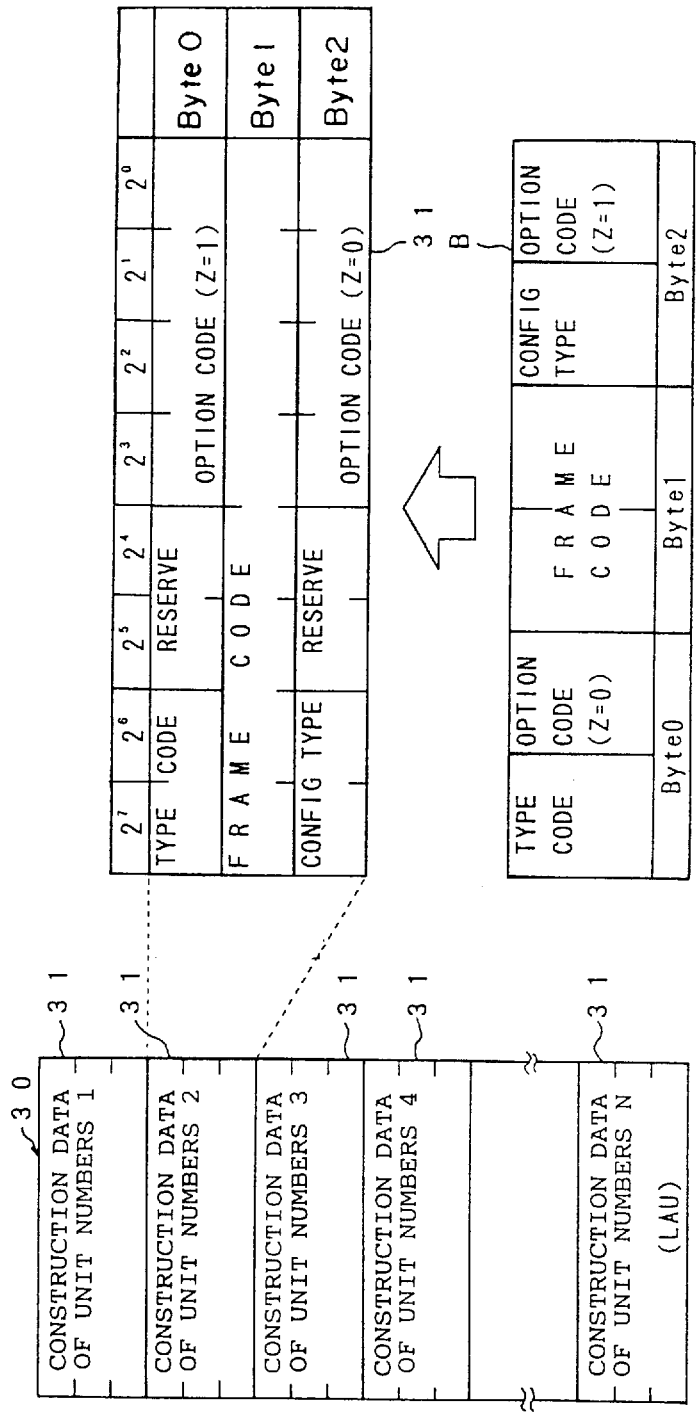
FIG. 8 is an explanatory chart showing an apparatus construction data table.

In step S014, the MPU 21 creates the apparatus construction data from the unit construction data obtained from the respective units. Namely, the MPU 21, as shown in FIG. 8, creates in the memory 22 an apparatus construction data table 30 consisting of a plurality of unit construction data areas 31 corresponding to the unit numbers, and stores the unit construction data area 31 corresponding to the relevant unit number with each piece of unit construction data. At this time, the MPU 21 stores the unit construction data areas 31 corresponding to the unit number "0" with the previously-held unit construction data of the garage unit L1. The MPU 21 stores the unit construction data areas 31 corresponding to the unit number "N" with the previously-held unit construction data of the garage unit R1. The apparatus construction data are thereby created in the apparatus construction data table 30. Note that the apparatus construction data table 30 has a 78-byte capacity enough to store 26-pieces of unit construction data at the maximum.

Subsequently, the MPU 21 stores the nonvolatile memory 24 with the apparatus construction data (the apparatus construction data table 30) created in the memory 22 (step S015). When finishing the process in step S015, the apparatus construction data creating process by the MPU 21 comes to an end.

Incidentally, the memory 22 is, as shown in FIGS. 9–11, stored with an option code table 33, a frame code table 34 and a config type table 35. With respect to the unit construction data stored in the apparatus construction data table 30, the MPU 21 reads out the data corresponding to the respective codes in the unit construction data from the option code table 33, the frame code table 34 and the config type table 35, and stores the nonvolatile memory 24 with these pieces of data made corresponding to the unit construction data.

The MPU 21 is thereby capable of grasping a total number of the units constituting the library apparatus 100, the positions in which the respective units are disposed, the types of the individual units, and the number of the cells 9 (the number of the accommodable cartridges C) possessed by the drum units 2a–2h.

Further, the memory 22 is stored with a cell address table 37 for storing the positional data (cell address data) of the individual cells 9 housed in the drum units 2a–2h. FIG. 12(a) is an explanatory diagram showing the cell address table 37. FIG. 12(a), however, shows only the cell address data of the single cell 9.

Referring to FIG. 12(a), the cell address table 37 is stored with a flag, a Z-address, a Y-address, a frame code and an X-address by way of the cell address data of the single cell 9.

The flag is defined as 2-bit data showing a cell attribute. FIG. 12(b) shows a table indicating a content of the flag stored in the cell address table 37. As shown in FIG. 12(b), the flags are of four kinds corresponding to the 2-bit data. Note that "CAS" in FIG. 12(b) shows an inserting/ejecting port for the cartridge C.

The Z-address is defined as 3-bit data indicting whether the cell 9 exists on one side (the side of Z=0) of the passageway 1 or on the other side (the side of Z=1) of the passageway 1. Specifically, "000" indicates the side of Z=1, while "001" indicates the side of Z=0.

The Y-address is defined as 8-bit data indicating which stage of the rocker 10 the cell 9 exists at. In accordance with this embodiment, the Y-address of the lowermost stage is set to "1 (decimal number)", while the Y-address of the uppermost stage is set to "53 (decimal number)".

The frame code is defined as 8-bit data showing the frame code of the drum unit housing the cell 9 (see FIG. The X-address is defined as 8-bit data showing which rocker 10, and which cell column of the rocker 10 the cell 9 exists in. Namely, the X-address is defined as the data showing a cell column number imparted beforehand to each rocker 10 of the drum 8. In accordance with the present embodiment, the cell column existing closest to the garage unit R1 (RAU) is set to "1 (decimal number)", and the cell column existing closest to the garage unit L1 (LAU) is set to "53 (decimal number)".

The cell address table 37 described above is prepared per frame code stored in the frame code table 34. The MPU 21 reads out from the memory 22 the cell address table 37 corresponding to the frame code contained in the each piece of unit construction data in the apparatus construction table 30. Subsequently, the MPU 21 stores the nonvolatile memory 24 with the read cell address table 37 in such a format as to make the same table corresponding to the unit construction data. The MPU 21 is thereby capable of grasping the positions (the cell addresses) of the respective cells 9 housed in the drum units 2a–2h.

Thereafter, the cartridge C is housed in each of the cells of the drum units 2a–2h. At this time, data (cartridge specifying data) for specifying the cartridge C is stored in the nonvolatile memory 24 while being made corresponding to the cell address data of each cell 9. Then, the host computer H is connected via the communication line to the controller 6 of the library apparatus 100. At this time, the cartridge specifying data of each cartridge C housed in the library apparatus 100, is transferred to the host computer H. The library apparatus 100 is thus installed through the processes described above.

<Operation Controlling Process of Accessor>

When operating the library apparatus 100 after the above processes, an operation control process of the accessor is executed, and the library apparatus 100 operates as follows. Upon switching ON the power supply of the library apparatus 100, the MPU 21 of the second subcontroller 6b copies into the memory 22 a content of the storage in the nonvolatile memory 24. Thereafter, it is assumed that, for example, a command purporting that data be recorded in a specified cartridge C, is inputted to the second subcontroller 6b from the host computer H.

Thereupon, the MPU 21 of the second subcontroller 6b fetches cartridge specifying data contained in the recording command received from the host computer H, and fetches from the memory 22 the cell address data corresponding to this piece of cartridge specifying data. Subsequently, the MPU 21, based on the frame code contained in the cell address data, fetches the unit construction data corresponding to the frame code from the apparatus construction data table 30. The cell 9 housing the relevant cartridge C, the drum unit housing the same cell 9 and an absolute position of the drum unit, are thereby specified.

Subsequently, the MPU 21 reads the positional data of one of the recording/reproducing units 3a–3d and the positional data of the slot 12 from the apparatus construction data table 30, thereby specifying each position thereof.

Then, the MPU 21 receives the present position of the accessor AR from the position detecting unit 27, and gives the driving circuit 26 a drive command for taking the cartridge C out of the cell 9 by moving the accessor AR from the present position to the position of the cell 9 housing the relevant cartridge C. Thereupon, the accessor Ar operates, and the relevant cartridge C is taken out of the relevant cell 9.

Subsequently, the MPU 21 gives the driving circuit 26 a drive command for indicating the accessor AR to carry the cartridge C up to one of the recording/reproducing units 3a–3d and to insert the cartridge C into the slot 12. Thereupon, the accessor AR operates, and carries the relevant cartridge C to one of the recording/reproducing units 3a–3d, and inserts the same cartridge C into the slot 12. Thus, the cartridge C is loaded into the recording/reproducing device 11, and a predetermined item of data are recorded on the magnetic tape encased in the cartridge C.

Note that the first subcontroller 6a also, when receiving a recording command etc of the specified cartridge C from the host computer H, controls the operation of the accessor AL by making use of a storage content of the nonvolatile memory 24 developed in the memory 22 of the second subcontroller 6b.

<Effects of Embodiment>

In accordance with the present embodiment, on the occasion of installing the library apparatus 100, the MPU 21 of the second subcontroller 6b executes the apparatus construction data creation program of the memory 22, thereby operating the accessor AR and the bar code reader 120. With this operations, the MPU 21 obtains the unit construction data from the respective bar code labels B attached to the drum units 2e–2h and the recording/reproducing units 3c, 3d, creates the apparatus construction data (the apparatus construction data table 30) from the respective pieces of unit construction data, and records the same data on the nonvolatile memory 24.

Then, when operating the library apparatus 100, each of the MPUs 21 of the first and second subcontrollers 6a, 6b generates the drive command of the motor unit 105 on the basis of the apparatus construction data, and gives the command to the driving circuit 26. In response thereto, the respective accessors AL, AR perform the operations (the carrying operation, the fetching operation and the housing operation with respect to the cartridge C) corresponding to the commands issued from the host computer H.

Thus, in accordance with the present embodiment, on the occasion of the installation of the library apparatus 100 which has hitherto manually done, the construction data of the respective units are inputted by reading the bar code labels B attached to the individual units. Therefore, a working time can be remarkably reduced irrespective of the unit constructions of the library apparatus 100 to be installed. Further, a mistake in terms of inputting the data can be eliminated by inputting the data without any manual operations. Hence, the library apparatus 100 can be installed easier than by the prior art, thereby making it feasible to same the labor.

Note that the bar code labels B are attached to the units existing on one side of the passageway 1 in the present embodiment but may also be attached all the units constituting the library apparatus 100. Further, the bar code labels B may be attached everywhere on condition that the labels B might be in such positions as to be readable by controlling the operations of the accessor AL and the bar code reader 120, or the accessor AR and the bar code reader 120. Furthermore, the record contents of the bar code labels B may be appropriately set.

It is apparent that, in this invention, a wide range of different working modes can be formed based on the invention without deviating from the spirit and scope of the invention. This invention is not restricted by its specific working modes except being limited by the appended claims.

What is claimed is:

1. A library apparatus comprising:
    one traveling path on which a carrying device which carries a recording medium travels;
    a housing unit disposed on a side of said traveling path, said housing unit housing a plurality of recording mediums;
    a data retainer provided with a surface of said housing unit facing to said carrying device, said data retainer retaining construction data indicating construction of said housing unit;
    a data reader provided with said carrying device, said data reader reading the construction data retained on said data retainer; and
    a controller controlling operations of said carrying device and of said data reader, obtaining the construction data of said housing unit from said data retainer through said data reader.

2. A library apparatus according to claim 1, wherein said housing unit houses a rocker which comprises a plurality of cell for storing said plurality of recording mediums, and
    wherein the construction data of said housing unit corresponds to a kind of said rocker housed in said housing unit.

3. A library apparatus according to claim 1 wherein the construction data of said housing unit corresponds to the number of said recording mediums that can be housed in said housing unit.

4. A library apparatus according to claim 1, wherein said data retainer is a bar code label, and said data reader is a bar code reader.

5. A library apparatus comprising:

one traveling path on which a carrying device which carries a recording medium travels;

a plurality of units disposed on at least one side of said traveling path;

a data retainer provided with a surface of each of said unit facing to said carrying device, each of said data retainer retaining construction data indicating construction of a unit corresponding to the data retainer;

a data reader provided with said carrying device, said data reader reading said construction data retained each of said data retainer;

a controller controlling operations of said carrying device and of said data reader, obtaining said construction data from each of said data retainer through said data reader;

and a processer generating construction data indicating of the library apparatus on the basis of said construction data which obtained by said controller.

6. A library apparatus according to claim 5, wherein the construction data of said library apparatus comprises data of the number of said units.

7. A library apparatus according to claim 5, wherein the construction data of said library apparatus comprises position data indicating a position of each of said unit.

8. A library apparatus according to claim 5, wherein any one of said units is a housing unit housing a rocker which comprises a plurality of cells for accomodating a recording mediums, and wherein said construction data of said library apparatus comprises position data indicating a position of each of said cell.

* * * * *

UNITED STATES PATENT AND TRADEMARK OFFICE
CERTIFICATE OF CORRECTION

PATENT NO.: 5,886,853
DATED : March 23, 1999
INVENTOR(S): Yoshida, et al.

It is certified that errors appear in the above-identified patent and that said Letters Patent is hereby corrected as shown below:

On the title page:
[21] Change "744" to --000,744--.

In the Drawings:
* Sheet 11 of 12
 Change "SERFACE" (all 16 occurrences) to --SURFACE--.

* Column 3,
 line 3, change "ber" to --bar--; and
 line 4, change "ber" to --bar--.

Column 12,
 line 33, after "(see Fig." insert --10).--; and
 line 34, "The" begins a new paragraph.

Column 16,
 line 1, after "and" insert --;--; and "a" begins a new paragraph.

Signed and Sealed this

Tenth Day of April, 2001

Attest:

NICHOLAS P. GODICI

*Attesting Officer*  *Acting Director of the United States Patent and Trademark Office*